(12) United States Patent
Sawada (10) Patent No.: US 12,491,797 B2
(45) Date of Patent: Dec. 9, 2025

(54) SHOULDER BLADE POSITION ESTIMATION APPARATUS AND SEAT

(71) Applicant: SUBARU CORPORATION, Tokyo (JP)

(72) Inventor: Naomichi Sawada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 226 days.

(21) Appl. No.: 18/203,782

(22) Filed: May 31, 2023

(65) Prior Publication Data
US 2024/0001811 A1    Jan. 4, 2024

(30) Foreign Application Priority Data

Jun. 30, 2022    (JP) .................................. 2022-105511

(51) Int. Cl.
*B60N 2/00*    (2006.01)
*B60N 2/02*    (2006.01)
(Continued)

(52) U.S. Cl.
CPC ......... *B60N 2/0028* (2023.08); *B60N 2/0034* (2023.08); *B60N 2/0244* (2013.01);
(Continued)

(58) Field of Classification Search
CPC .. B60N 2/0028; B60N 2/0034; B60N 2/0244; B60N 2/22; B60N 2/02246;
(Continued)

(56) References Cited

U.S. PATENT DOCUMENTS

| 8,478,486 B2 * | 7/2013 | Kato ..................... B60W 50/10 |
| | | 701/41 |
| 9,045,058 B2 * | 6/2015 | Katoh ..................... B60N 2/64 |
| (Continued) | | |

FOREIGN PATENT DOCUMENTS

| JP | 2004-291736 A | 10/2004 |
| JP | 2007-331650 A | 12/2007 |
| (Continued) | | |

OTHER PUBLICATIONS

JP 2015013621 A machine translation (Year: 2015).*
Japanese Office Action, dated Sep. 30, 2025 in Japanese Application No. JP2022-105511 and English Translation Thereof.

*Primary Examiner* — Fadey S. Jabr
*Assistant Examiner* — Mark Robert Heim
(74) *Attorney, Agent, or Firm* — MCGINN I.P. LAW GROUP, PLLC (57) ABSTRACT

A shoulder blade position estimation apparatus for a vehicle is provided in a seat on which an occupant operating a steering wheel of the vehicle is seated, and configured to estimate positions of shoulder blades of the occupant. The shoulder blade position estimation apparatus includes a surface pressure sensor and a shoulder blade position estimation unit. The seat includes a seat surface member on which thighs and a waist of the occupant are placed, and a seat back disposed in rear of an upper body of the occupant. The surface pressure sensor detects a distribution of surface pressures that the seat back receives from the upper body of the occupant. When the occupant turns the steering wheel by a predetermined angle, the shoulder blade position estimation unit estimates that the shoulder blades are present near a region where the surface pressures on left and right sides change in opposite directions.

17 Claims, 6 Drawing Sheets

(51) Int. Cl.
  *B60N 2/22*       (2006.01)
  *B60Q 9/00*       (2006.01)
(52) U.S. Cl.
  CPC .................. *B60N 2/22* (2013.01); *B60Q 9/00*
       (2013.01); *B60N 2/02246* (2023.08); *B60N*
       *2/0268* (2023.08); *B60N 2210/24* (2023.08);
                         *B60N 2210/40* (2023.08)
(58) Field of Classification Search
  CPC ............. B60N 2/0268; B60N 2210/24; B60N
        2210/40; B60N 2/026; B60W 2050/146;
        B60W 50/08; B60W 2540/18; B62D
        15/021; B62D 15/02; B60Q 9/00
  See application file for complete search history.

(56) References Cited

U.S. PATENT DOCUMENTS

| | | | | |
|---|---|---|---|---|
| 9,802,513 | B2* | 10/2017 | Katoh | B60N 2/2222 |
| 10,737,599 | B2* | 8/2020 | Yoshikawa | B60N 2/2222 |
| 11,584,269 | B2* | 2/2023 | Muck | B60N 2/39 |
| 2007/0255469 | A1* | 11/2007 | Uenuma | B60N 2/986 |
| | | | | 701/1 |
| 2010/0283299 | A1* | 11/2010 | Onuma | B60N 2/02246 |
| | | | | 297/337 |
| 2011/0178680 | A1* | 7/2011 | Kato | B60T 7/14 |
| | | | | 701/1 |
| 2013/0009761 | A1* | 1/2013 | Horseman | A61B 5/6893 |
| | | | | 340/576 |
| 2016/0221481 | A1* | 8/2016 | Sugiyama | B60N 2/64 |
| 2017/0088029 | A1 | 3/2017 | Mizoi et al. | |
| 2017/0267145 | A1* | 9/2017 | Gonzalez Uribe | B60N 2/68 |
| 2019/0241096 | A1* | 8/2019 | Ito | B60N 2/02246 |
| 2019/0248260 | A1* | 8/2019 | Yoshikawa | B60N 2/2222 |
| 2019/0283639 | A1 | 9/2019 | Mizoi et al. | |
| 2020/0093279 | A1* | 3/2020 | Lee | B60N 2/0273 |
| 2021/0146814 | A1 | 5/2021 | Mizoi et al. | |
| 2022/0410880 | A1* | 12/2022 | Yasui | B60W 30/09 |
| 2023/0055181 | A1* | 2/2023 | Huang | G01B 21/26 |
| 2023/0371709 | A1* | 11/2023 | Tuli | A47C 31/123 |
| 2024/0010145 | A1* | 1/2024 | Derichs | B60N 2/0244 |
| 2024/0300395 | A1* | 9/2024 | Mizoi | B60N 2/976 |

FOREIGN PATENT DOCUMENTS

| | | | |
|---|---|---|---|
| JP | 2015013621 A | * | 1/2015 |
| JP | 2019-137286 A | | 8/2019 |
| JP | 2020-23322 A | | 2/2020 |

* cited by examiner

SHOULDER BLADE POSITION ESTIMATION APPARATUS AND SEAT

CROSS-REFERENCE TO RELATED APPLICATIONS

The present application claims priority from Japanese Patent Application No. 2022-105511 filed on Jun. 30, 2022, the entire contents of which are hereby incorporated by reference.

BACKGROUND

The disclosure relates to a shoulder blade position estimation apparatus for estimating positions of shoulder blades of an occupant seated on a seat, and a seat supporting the shoulder blades of the occupant using such a shoulder blade position estimation apparatus.

For example, as a technique related to a vehicle seat, Japanese Unexamined Patent Application Publication (JP-A) No. 2019-137286 describes an occupant posture adjusting apparatus measuring a body pressure value of an occupant and adjusting a way to support the pelvis and shoulder blades to allow for an appropriate body pressure value of the occupant. The apparatus includes: a bottom part support member pivotally supported by a seat cushion immediately under a hip point to support thighs from below, a lower part support member pivotally supported by a seat back at a lower position than the seat back to support the pelvis from rearward, an upper part support member supporting the shoulder blades pivotally supported by the seat back at a higher position than the seat back from rearward, and a controller controlling a drive that drives the support members.

JP-A No. 2020-23322 describes that a seat back is provided in a vehicle seat, an air cell inflated by encapsulating air is provided in the seat back for stabilizing a fixed state of a bag body inflated to push shoulders of a seated person, and the air cell extends in a predetermined direction and includes protrusions provided in both ends of the air cell in an extension direction. Furthermore, the protrusions provided in both ends of the air cell in the extension direction are fixed to fixing positions apart in a width direction of the vehicle seat to be mounted in the seat back.

JP-A No. 2007-331650 describes a steering support apparatus for improving steerability in a cramped posture in which an occupant's upper body is closer to a steering wheel. The steering support apparatus includes a seat back displacement member that can displace left and right shoulder members of at least left and right upper portions of a support surface that supports a driver, who drives a vehicle, in a seat back of a driver's seat in a vehicle rearward direction independently, and exercises a steering support control to displace at least the shoulder members on a side of a steering direction of the support surface, in the vehicle rearward direction.

SUMMARY

An aspect of the disclosure provides a shoulder blade position estimation apparatus for a vehicle. The shoulder blade position estimation apparatus is provided in a seat on which an occupant operating a steering wheel of the vehicle is seated, and configured to estimate positions of shoulder blades of the occupant. The shoulder blade position estimation apparatus includes a surface pressure sensor and a processor configured to function as a shoulder blade position estimation unit. The seat includes a seat surface member on which thighs and a waist of the occupant are to be placed, and a seat back to be disposed in rear of an upper body of the occupant. The surface pressure sensor is configured to detect a distribution of surface pressures that the seat back receives from the upper body of the occupant. The shoulder blade position estimation unit is configured to, when the occupant turns the steering wheel by a predetermined angle, estimate that the shoulder blades are present near a region where the surface pressures, which are on a left side and a right side respectively, change in opposite directions.

An aspect of the disclosure provides a shoulder blade position estimation apparatus for a vehicle. The shoulder blade position estimation apparatus is provided in a seat on which an occupant operating a steering wheel of the vehicle is seated, and configured to estimate positions of shoulder blades of the occupant. The shoulder blade position estimation apparatus includes a surface pressure sensor and a processor configured to function as a shoulder blade position estimation unit. The seat includes a seat surface member on which thighs and a waist of the occupant are to be placed, and a seat back to be disposed in rear of an upper body of the occupant. The surface pressure sensor is configured to detect a distribution of surface pressures that the seat back receives from the upper body of the occupant. The shoulder blade position estimation unit is configured to, when the occupant turns hands of the occupant along a rim of the steering wheel by a predetermined angle, estimate that the shoulder blades are present near a region where the surface pressures change in opposite directions.

An aspect of the disclosure provides a seat including the shoulder blade position estimation apparatus, a support member, and a support member driver, and a support member control unit. The support member is provided in the seat back and formed from a harder material than other members of the seat back. The support member driver includes an actuator and is configured to drive the support member vertically with respect to the seat back. The support member control unit is communicably connected with the support member driver and configured to control the support member driver to adjust a position of the support member. The support member control unit is configured change a vertical position of the support member in response to the estimated positions of the shoulder blades.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

To improve easiness to perform steering operation (steering wheel operation) on a vehicle such as a motor vehicle, it is desirable to enhance rigidity for supporting surroundings of shoulder blades on the back of a human body to which an operation reaction force is input, and inhibit a human body motion in a yaw direction (rotation direction about a vertical axis) during the steering operation.

On the other hand, when the positions of members supporting the shoulder blades are inappropriate and acromia located, for example, at a height from the first vertebra to a third vertebra, are supported, the occupant feels uncomfortable. Therefore, it is necessary to accurately estimate a height position from the fourth vertebra to the seventh vertebra where the shoulder blades are present despite a difference in occupant's build.

It is desirable to provide a shoulder blade position estimation apparatus capable of appropriately estimating positions of shoulder blades of an occupant, and a seat capable of appropriately supporting the shoulder blades of the occupant.

An aspect of the disclosure provides a shoulder blade position estimation apparatus, provided in a seat on which an occupant operating a steering wheel of a vehicle is seated, for estimating positions of shoulder blades of the occupant includes a surface pressure sensor and a shoulder blade position estimation unit. The seat includes a seat surface member on which thighs and a waist of the occupant are placed, and a seat back disposed in rear of an upper body of the occupant. The surface pressure sensor is configured to detect a distribution of surface pressures that the seat back receives from the upper body of the occupant. The shoulder blade position estimation unit is configured to, when the occupant turns the steering wheel by a predetermined angle, estimate that the shoulder blades are present near a region where the surface pressures, on left and right sides, detected by the surface pressure sensor change in opposite directions.

When the occupant performs steering operation (typically, steers the steering wheel by, for example, approximately 90° in a state of gripping left and right ends of the steering wheel in a front view of the steering wheel), a surface pressure transmitted from the shoulder blades on the back of the occupant to the seat back increases on an outer side of turn steering (left side for right turn steering) and decreases on an inner side of the turn steering.

In this way, detecting such a phenomenon unique to the steering operation that the surface pressures on the left and right sides change in opposite directions allows for appropriate estimation of the positions of the shoulder blades of the occupant.

An aspect of the disclosure provides a shoulder blade position estimation apparatus, provided in a seat on which an occupant operating a steering wheel of a vehicle is seated, for estimating positions of shoulder blades of the occupant includes a surface pressure sensor and a shoulder blade position estimation unit. The seat includes a seat surface member on which thighs and a waist of the occupant are placed, and a seat back disposed in rear of an upper body of the occupant. The surface pressure sensor is configured to detect a distribution of surface pressures that the seat back receives from the upper body of the occupant. The shoulder blade position estimation unit is configured to, when the occupant turns hands along a rim of the steering wheel by a predetermined angle, estimate that the shoulder blades are present near a region where the surface pressures detected by the surface pressure sensor change in opposite directions.

Since a surface pressure change similar to a case of actually operating the steering wheel occurs to the seat back, similar effects to those described above can be obtained.

The shoulder blade position estimation apparatus may include an information presentation unit configured to present information prompting the occupant to perform one or more of a motion of turning the steering wheel by the predetermined angle and a motion of turning the hands along the rim of the steering wheel by the predetermined angle.

According to this, prompting the occupant to execute each operation can surely cause a difference between the surface pressures on the left and right sides of the shoulder blades, and it is possible to estimate the positions of the shoulder blades.

In this case, the information presentation unit may present information prompting the occupant to perform one or more of the motion of turning the steering wheel by the predetermined angle and the motion of turning the hands along the rim of the steering wheel by the predetermined angle, at least once each in left and right directions.

According to this, making the occupant perform the motions of turning the steering wheel and the like on each of the left and right sides allows for the improvement in accuracy for estimating the positions of the shoulder blades.

An aspect of the disclosure provides a seat including the shoulder blade position estimation apparatus of any of the above aspects, a support member, a support member driver, and a support member control unit. The support member is provided in the seat back and is formed from a harder material than other members of the seat back. The support member driver is configured to drive the support member vertically with respect to the seat back. The support member control unit is configured to control the support member driver to adjust a position of the support member. The support member control unit changes a vertical position of the support member in response to the positions of the shoulder blades estimated by the shoulder blade position estimation unit.

According to this, by setting the height of the support member appropriately in response to the positions of the shoulder blades of the occupant, it is possible to enhance the rigidity for supporting the shoulder blades on the back of the occupant, and improve easiness to perform the steering operation.

As described so far, it is possible to provide the shoulder blade position estimation apparatus capable of appropriately estimating the positions of the shoulder blades of the occupant, and the seat capable of appropriately supporting the shoulder blades of the occupant.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A seat 1 according to the embodiment is, for example, a seat that is used as a front seat (driver's seat) of a vehicle such as a passenger vehicle and on which an occupant 100 (driver who drives the vehicle) is seated.

The shoulder blade position estimation apparatus according to the embodiment estimates positions of shoulder blades 132 of the occupant 100 in a state of being seated on the seat 1.

Figure 1:
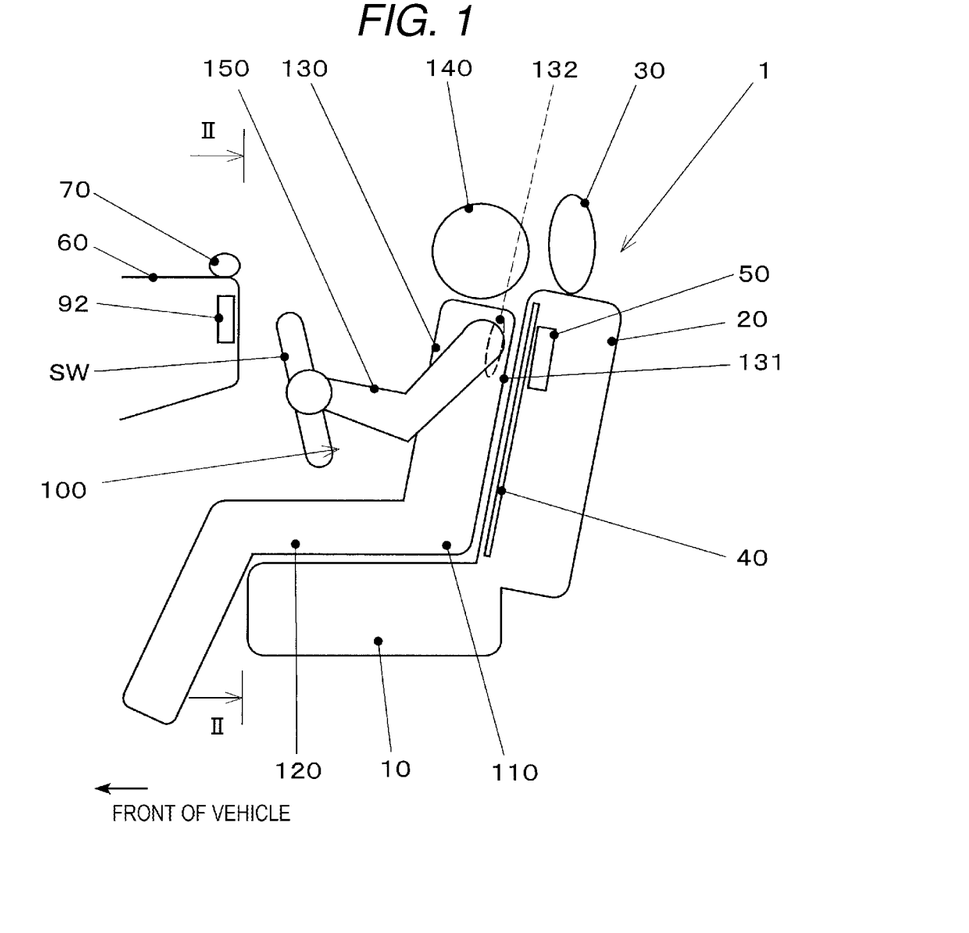
FIG. 1 is a schematic side view of an embodiment of a seat having a shoulder blade position estimation according to an embodiment of the disclosure is applied.

FIG. 1 is a schematic side view of the seat according to the embodiment.

Figure 2:
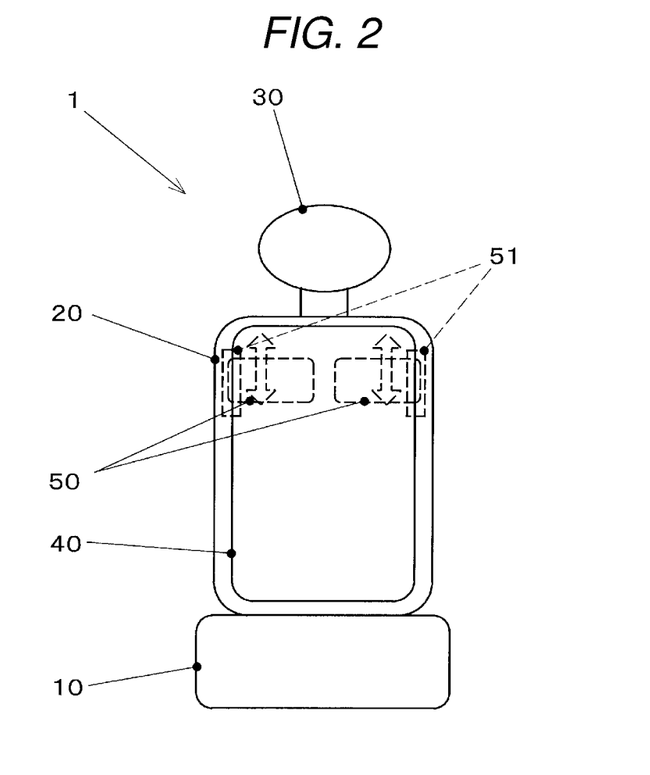
FIG. 2 is an arrow view of part II-II of FIG. 1.

FIG. 2 is an arrow view of part II-II of FIG. 1. In FIG. 2, the occupant 100 is not illustrated.

The seat 1 according to the embodiment includes a seat surface member 10, a seat back 20, a headrest 30, a surface pressure sensor 40, a shoulder blade support member 50, and the like.

The seat surface member 10 is a part on which a waist 110 and thighs 120 of the occupant 100 who is a seated person are placed.

The seat back 20 is a backrest part (backrest) disposed along the back 131 of an upper body 130 of the occupant 100.

The seat back 20 extends upward from near a rear end of the seat surface member 10.

The headrest 30 protrudes upward from an upper end of the seat back 20 and supports a rear part of the head 140 of the occupant 100.

Furthermore, a steering wheel SW with which the occupant 100 performs steering operation using arms 150 is provided in front of the occupant 100.

When the occupant 100 performs the steering operation with the steering wheel SW, an operation reaction force against the steering operation is input from shoulder blades 132 through the back 131 to press the seat back 20 rearward.

The surface pressure sensor 40 is a surface pressure measurement member that is provided in a surface part of the seat back 20 abutting on the back 131 of the occupant 100, and that measures a distribution of surface pressures (body pressures) that the seat back 20 receives from the back 131.

The surface pressure sensor 40 may be configured with, for example, pressure sensitive elements, such as pairs of pressure sensitive conductive ink electrodes, having resistance values changing in response to a received pressure in a matrix array along a surface direction of a membrane sensor sheet.

The shoulder blade support member 50 is a member that supports a region near the shoulder blades 132 on the back 131 of the occupant 100.

The shoulder blade support member 50 is provided along a surface part of the seat back 20 opposed to the back 131 and formed as, for example, a panel-shaped hard member using a harder material than the other parts (urethane foam or the like) of the seat back 20.

In a region where the shoulder blade support member 50 is provided, an elastic deformation of the urethane foam and the like of the seat back 20 is inhibited, which enhances rigidity of the seat back 20 against a load input from the back 131 of the occupant 100.

For example, a pair of shoulder blade support members 50 are provided symmetric about a center line in left and right directions of the seat back 20.

The shoulder blade support members 50 are mounted to the seat back 20 to be relatively displaceable in a vertical direction to the seat back 20 to fit each occupant's different build.

An actuator 51 (refer to FIGS. 2, 3) is provided in each shoulder blade support member 50.

The actuator 51 has a function of driving and moving the shoulder blade support member 50 along the seat back 20 vertically.

The actuator 51 may be configured as, for example, an electric actuator having an electric motor, a reducing gear train, and the like. It is noted that the actuator 51 is not limited to this. An actuator of another kind may be used as the actuator 51.

In the present embodiment, the actuator 51 has functions of estimating a position (height) of the shoulder blades 132 of the occupant 100 and automatically adjusting a height of the shoulder blade support member 50. These functions will be described later in detail. Furthermore, a camera 70 is provided in an instrument panel 60 that is a vehicle interior member disposed to be opposed to the seat 1.

For example, the camera 70 has a solid-state imaging device such as a CMOS and CCD, an output processing circuit for the solid-state imaging device, and an imaging optical system (lens group).

The camera 70 captures images of the occupant 100 seated on the seat 1 and transmits obtained image data to a driver monitoring system 80.

Figure 3:
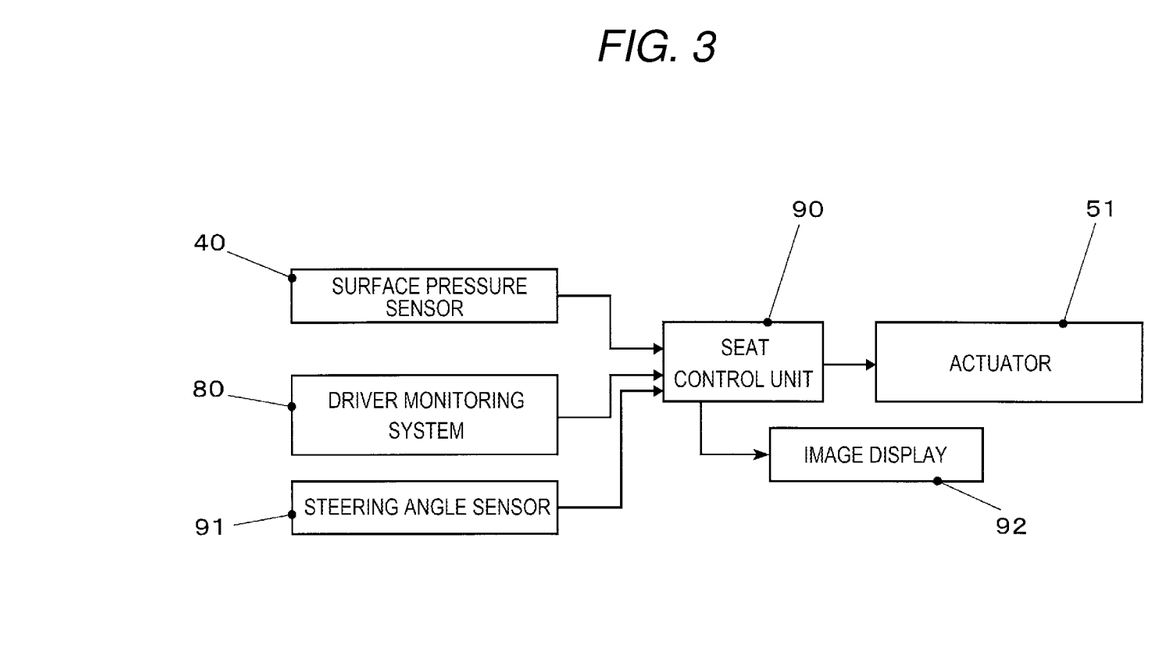
FIG. 3 is a block diagram schematically illustrating configurations of a control system in the shoulder blade position estimation apparatus and the seat according to the embodiment.

FIG. 3 is a block diagram schematically illustrating configurations of a control system for the shoulder blade position estimation apparatus and the seat according to the embodiment.

The control system for the shoulder blade position estimation apparatus and the seat 1 is configured with the surface pressure sensor 40 and the actuators 51 described above, the driver monitoring system 80, a seat control unit 90, and the like.

The driver monitoring system 80 is an image processor that identifies the seated person (driver) 100 seated on the seat 1 by facial recognition and that acquires information related to a build based on the images captured by the camera 70.

The driver monitoring system 80 has a function to, for example, determine a height position of a first thoracic vertebra present in an upper portion of shoulders of the occupant 100 (near an upper end of the upper body 130).

The seat control unit 90 controls the actuators 51 based on information from the surface pressure sensor 40, the driver monitoring system 80, a steering angle sensor 91, and the like.

The seat control unit 90 may be configured as a microcomputer including, for example, an information processor such as a CPU, recording members such as a RAM and a ROM, an input/output interface, and a bus coupling these elements.

In one embodiment, the seat control unit 90 may serve as a "shoulder blade position estimation unit" and a "support member control unit".

Functions and operation of the seat control unit 90 will be described later in detail.

The steering angle sensor 91 and an image display 92 are coupled to the seat control unit 90.

The steering angle sensor 91 is an angle encoder that detects a rotational angle of the steering wheel SW.

The steering angle sensor 91 is provided in a steering column (steering shaft) that transmits a rotation of the steering wheel SW to a steering gearbox, not illustrated.

The steering angle sensor 91 is used to control, for example, an electric power steering device and a vehicle body behavior control device. An output from the steering angle sensor 91 is also transmitted to the seat control unit 90.

The image display 92 is an information presentation unit, such as an LCD and an organic EL display, provided on, for example, the instrument panel 60 and presenting image information, including characters, symbols, and patterns, to the occupant 100.

The operations of the shoulder blade position estimation apparatus and the seat according to the embodiment will be described hereinafter.

Figure 4:
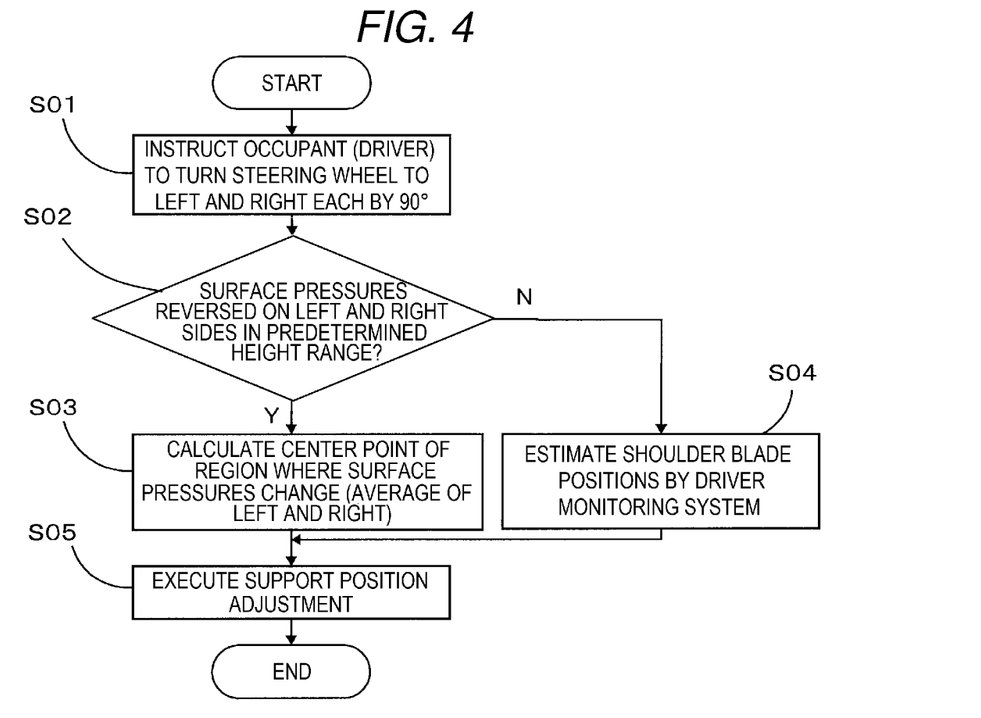
FIG. 4 is a flowchart illustrating operations of the shoulder blade position estimation apparatus and the seat according to the embodiment.

FIG. 4 is a flowchart illustrating operations of the shoulder blade position estimation apparatus and the seat according to the embodiment.

A process will now be described step by step.

Step S01: Instruct Occupant to Perform Left and Right Turn Steering

The seat control unit 90 outputs a display, using the image display 92, to prompt the occupant 100 (driver) seated on the seat 1 of the driver's seat to perform turn steering (steering) operation for turning the steering wheel SW from a neutral position to the left (counterclockwise) by 90° and returning to the neutral position, and further for turning the steering wheel SW to the right (clockwise) by 90° and returning to the neutral position.

At this time, the occupant 100 is alerted to keep gripping left and right sides of the steering wheel SW with hands of the occupant 100 in a neutral state without changing grip hands.

After the seat control unit 90 determines the completion of the steering operation based on an output from the steering angle sensor 91, the process goes to Step S02.

Step S02: Determine Whether Surface Pressures are Reversed on Left and Right Sides in Predetermined Height Range The seat control unit 90 determines whether there is a region where surface pressures on left and right sides of a human body of the occupant 100 in a predetermined height range of the seat back 20 change in opposite directions, based on the surface pressure data measured by the surface pressure sensor 40 during the steering operation.

Here, the predetermined height range may be set as, for example, a range in which the shoulder blades of a human body of an ordinary build could be present and in which a distance from the seat surface member 10 along a surface of the seat back 20 is 455+15 mm.

Figure 5:
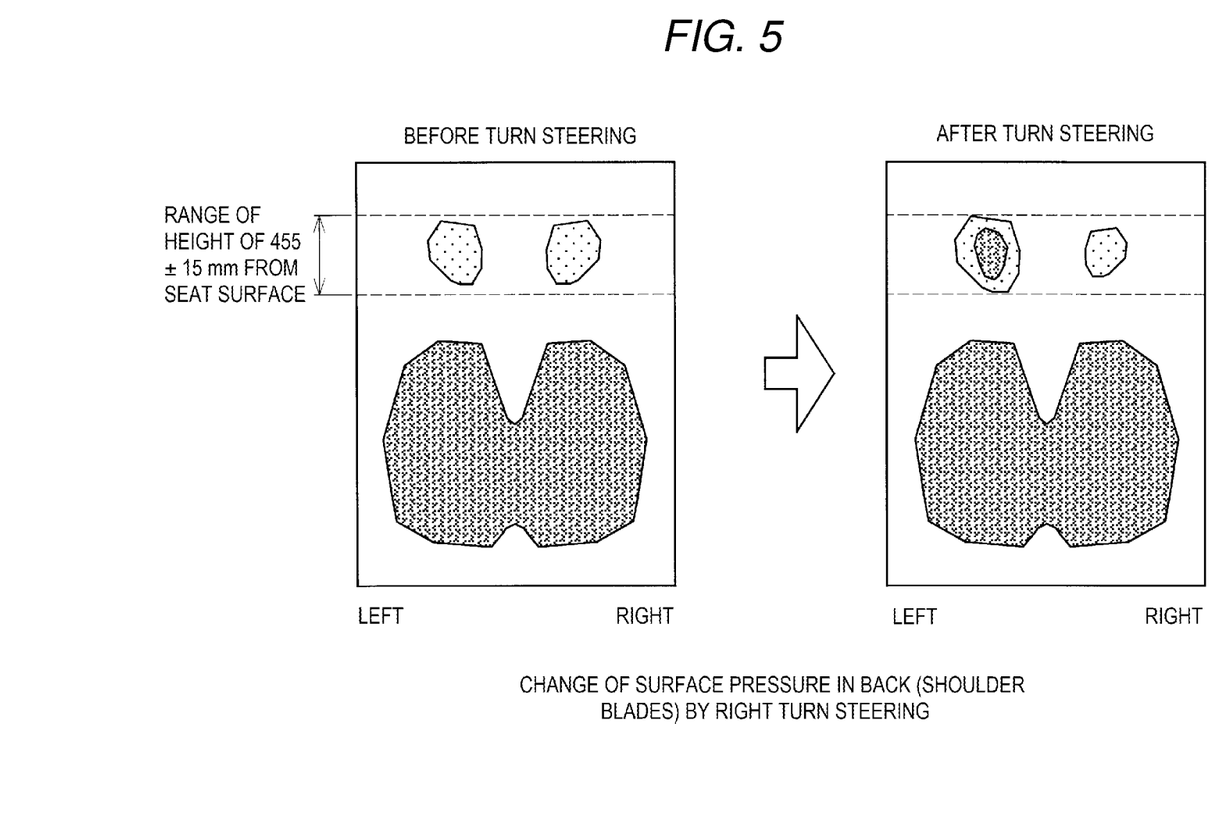
FIG. 5 is a schematic diagram illustrating an example of seat back surface pressure distributions before and after an occupant's turn steering motion.

FIG. 5 is a schematic diagram illustrating an example of seat back surface pressure distributions before and after an occupant's turn steering motion.

In FIG. 5, shading indicates magnitudes of the surface pressures (the darker, the higher).

As illustrated in FIG. 5, when the occupant 100 performs right turn steering, in the height range of 455+15 mm from the seat surface member 10, a region where the surface pressure equal to or higher than a predetermined pressure is generated decreases on the right side, such a region increases on the left side, and the surface pressure further increases in a central portion.

Figure 6:
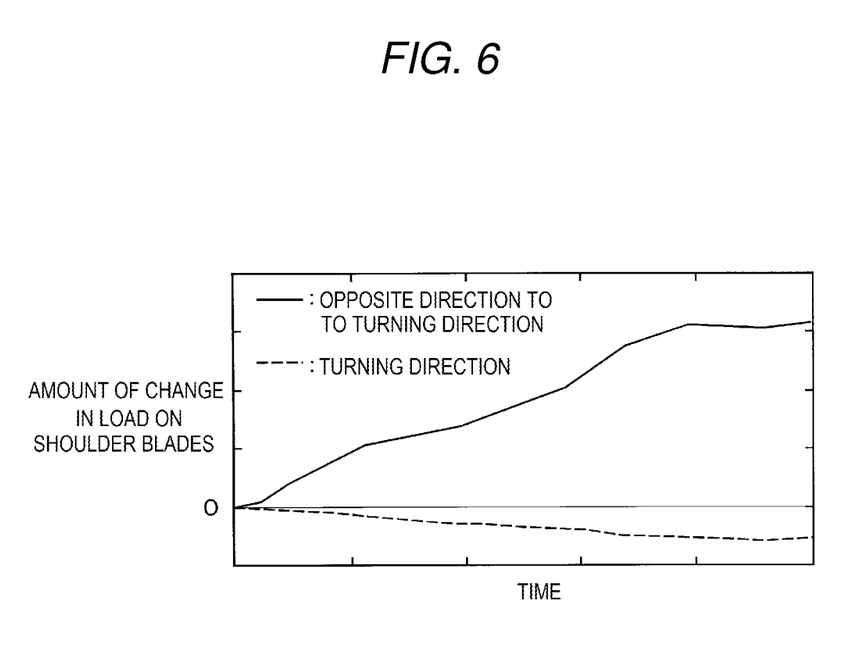
FIG. 6 illustrates an example of a transition of seat back loads of left and right shoulder blades during the occupant's steering motion.

FIG. 6 illustrates an example of a transition of seat back loads of left and right shoulder blades during the occupant's steering motion.

In FIG. 6, a horizontal axis indicates a time and a vertical axis indicates a load (obtained by integrating the surface pressure in the range, in which the surface pressure is generated, by an area).

As illustrated in FIG. 6, as the turn steering motion starts and progresses, an operation reaction force is input to the seat back 20 via the shoulder blades 132 to increase the load on an opposite side to a turning direction, while the load decreases on a side of the turning direction.

When the seat control unit 90 recognizes the surface pressures on the left and right sides change in the opposite directions, the process goes to Step S03; otherwise, the process goes to Step S04.

Step S04: Estimate Shoulder Blade Positions by Driver Monitoring System

The seat control unit 90 estimates the positions of the shoulder blades of the occupant 100 based on outputs from the surface pressure sensor 40 and the driver monitoring system 80 using a computational expression.

In this computational expression, spine height statistics are used, assuming that an upper end of the shoulder blades except for the acromia is a fourth thoracic vertebra and that a lower end of the shoulder blades is a seventh thoracic vertebra.

It is also assumed that a distance from the upper end to the lower end of the shoulder blades except for the acromia is identical to a distance from the fourth thoracic vertebra to the seventh thoracic vertebra.

As described above, the driver monitoring system 80 can estimate the height of the first thoracic vertebra of the occupant 100 based on the captured images of the camera 70.

Furthermore, when there is a local fall in the surface pressure at the height, e.g., 215 to 220 mm from the seat surface member 10 in the surface pressure distribution detected by the surface pressure sensor 40, this height is considered to correspond to a height of a third lumbar vertebra. It is noted that the height of the first thoracic vertebra can be estimated by the surface pressure sensor 40 as an alternative to the driver monitoring system 80 or together with the driver monitoring system 80.

In this case, a distance from the height of the first thoracic vertebra to the fourth thoracic vertebra (shoulder blade upper end) can be calculated by the following Equation.

(Height of first thoracic vertebra to height of fourth thoracic vertebra)=(height of first thoracic vertebra to height of third lumbar vertebra)/(statistical estimated value of height of first thoracic vertebra to height of third lumbar vertebra)× (statistical estimated value of height of first thoracic vertebra to height of fourth thoracic vertebra)

After computing the positions of the shoulder blades, the process goes to Step S05.

Step S05: Execute Support Position Adjustment

The seat control unit 90 controls the actuators 51 to execute height adjustment so that the shoulder blade support members 50 are opposed to regions near the shoulder blades 132 on the back 131 of the occupant 100 in response to the positions (height) of the shoulder blades 132 obtained in Step S03 or S04.

In this case, the seat control unit 90 may be configured to make adjustments such that the shoulder blades 132 and the shoulder blade support members 50 are disposed superimposed at least partially in a vehicle front view.

Subsequently, a series of process steps are ended (returned).

According to the embodiment described so far, the following effects can be obtained.

(1) When the occupant 100 performs steering operation (typically, steers the steering wheel SW by, for example, approximately 90° in a state of gripping left and right ends of the steering wheel SW in a front view of the steering wheel SW), the surface pressure transmitted from the vicinity of the shoulder blades 132 on the back 131 to the seat back 20 increases on an outer side of the turn steering (on the left side for right turn steering) and decreases on an inner side of the turn steering.

According to the present embodiment, detecting such a phenomenon unique to the steering operation that the surface pressures on the left and right sides change in opposite directions allows for appropriate estimation of the positions of the shoulder blades 132 of the occupant 100.

(2) By including the image display 92 that presents information prompting the occupant 100 to perform the motion of turning the steering wheel SW by a predetermined angle, it is possible to ensure that the occupant 100 performs the steering operation and to appropriately estimate the positions of the shoulder blades 132.

(3) By prompting the occupant to perform the motion of turning the steering wheel SW by a predetermined angle at least once in left and right directions, it is possible to improve accuracy for estimating the positions of the shoulder blades 132.

(4) By adjusting the heights of the shoulder blade support member 50 in response to the estimated positions of the shoulder blades 132 of the occupant 100, it is possible to enhance the rigidity for supporting the shoulder blades 132 on the back 131 of the occupant 100 and improve easiness to perform the steering operation.

Modified Example

The disclosure is not limited to the embodiment described so far and various modifications and changes are also within a technical scope of the disclosure.

(1) Configurations of the shoulder blade position estimation apparatus and the seat can be changed appropriately without limitation to the embodiment.

For example, shapes, structures, materials, manufacturing methods, numbers, arrangement, and the like of the elements configuring the apparatus and the seat can be changed from those according to the embodiment appropriately.

(2) In the embodiment, the positions of the shoulder blades are estimated using the change in the surface pressure of the seat back when the occupant actually performs the motion (turn steering motion) of turning the steering wheel. Even when the occupant does not actually turn the steering wheel or when the occupant performs a motion of sliding hands along the rim of the steering wheel, the positions of the shoulder blades can be estimated similarly to the embodiment.

In this case, the information presentation unit may output information prompting the occupant to perform a simulative turn steering motion as an alternative to the actual turn steering motion.

Furthermore, a turning angle of the motion of turning the steering wheel or performing the simulative turn steering motion is not limited to, for example, 90° as in the embodiment and can be changed as appropriate.

(3) In the embodiment, the information prompting the occupant to perform the turn steering motion is presented to the occupant so that the occupant performs the turn steering motion for estimating the positions of the shoulder blades. The disclosure is not limited to such configurations and the positions of the shoulder blades may be estimated based on, for example, a change in the surface pressure of the seat back during a turn steering motion usually performed in a driving cycle.

The invention claimed is:

1. A shoulder blade position estimation apparatus for a vehicle, the shoulder blade position estimation apparatus being provided in a seat on which an occupant operating a steering wheel of the vehicle is seated, and configured to estimate positions of shoulder blades of the occupant, the seat having a seat surface member on which thighs and a waist of the occupant are to be placed and a seat back to be disposed in rear of an upper body of the occupant, the shoulder blade position estimation apparatus comprising:
 a surface pressure sensor configured to detect a distribution of surface pressures that the seat back receives from the upper body of the occupant; and
 a processor configured to function as a shoulder blade position estimation unit, the shoulder blade position estimation unit being configured to estimate that the shoulder blades are present next to a region where the surface pressures, which are on a left side and a right side respectively, change in opposite directions based on the occupant turning the steering wheel by a predetermined angle; and
 an actuator configured to automatically adjust a height of a support member, to support the shoulder blade of the occupant, mounted to the seat back based on a result of the shoulder blade position estimation unit.

2. A shoulder blade position estimation apparatus for a vehicle, the shoulder blade position estimation apparatus being provided in a seat on which an occupant operating a steering wheel of the vehicle is seated, and configured to estimate positions of shoulder blades of the occupant, the seat having a seat surface member on which thighs and a waist of the occupant are to be placed and a seat back to be disposed in rear of an upper body of the occupant, the shoulder blade position estimation apparatus comprising:
 a surface pressure sensor configured to detect a distribution of surface pressures that the seat back receives from the upper body of the occupant;
 a processor configured to function as a shoulder blade position estimation unit, the shoulder blade position estimation unit being configured to estimate that the shoulder blades are present next to a region where the surface pressures change in opposite directions based on the occupant turning hands of the occupant along a rim of the steering wheel by a predetermined angle; and
 an actuator configured to automatically adjust a height of a support member, to support the shoulder blade of the occupant, mounted to the seat back based on a result of the shoulder blade position estimation unit.

3. The shoulder blade position estimation apparatus according to claim 1, further comprising:
 an information presentation unit configured to present information prompting the occupant to perform one or both of a motion of turning the steering wheel by the predetermined angle and a motion of turning the hands along the rim of the steering wheel by the predetermined angle.

4. The shoulder blade position estimation apparatus according to claim 2, further comprising:
 an information presentation unit configured to present information prompting the occupant to perform one or both of a motion of turning the steering wheel by the predetermined angle and a motion of turning the hands along the rim of the steering wheel by the predetermined angle.

5. The shoulder blade position estimation apparatus according to claim 3, wherein the information presentation unit presents information prompting the occupant to perform one or both of the motion of turning the steering wheel by the predetermined angle and the motion of turning the hands along the rim of the steering wheel by the predetermined angle, at least once in a left direction and at least once in a right direction.

6. The shoulder blade position estimation apparatus according to claim 4, wherein the information presentation unit presents information prompting the occupant to perform one or both of the motion of turning the steering wheel by the predetermined angle and the motion of turning the hands along the rim of the steering wheel by the predetermined angle, at least once in a left direction and at least once in a right direction.

7. A seat comprising:
the shoulder blade position estimation apparatus according to claim 1;
the support member provided in the seat back and formed from a harder material than other members of the seat back;
a support member driver including the actuator configured to drive the support member vertically with respect to the seat back; and
a support member control unit communicably connected with the support member driver and configured to control the support member driver to adjust a position of the support member,
wherein the support member control unit is configured change a vertical position of the support member in response to the estimated positions of the shoulder blades.

8. A seat comprising:
the shoulder blade position estimation apparatus according to claim 2;
the support member provided in the seat back and formed from a harder material than other members of the seat back;
a support member driver including the actuator configured to drive the support member vertically with respect to the seat back; and
a support member control unit communicably connected with the support member driver and configured to control the support member driver to adjust a position of the support member,
wherein the support member control unit is configured change a vertical position of the support member in response to the estimated positions of the shoulder blades.

9. The shoulder blade position estimation apparatus according to claim 1, further comprising a driver monitoring system that is an image processor that identifies the occupant seated on the seat by facial recognition and that acquires information related to a build based on images captured by a camera.

10. The shoulder blade position estimation apparatus according to claim 9, wherein the driver monitoring system is configured to determine a height position of a first thoracic vertebra present in an upper portion of shoulders of the occupant.

11. The shoulder blade position estimation apparatus according to claim 9, wherein the actuator further bases the height adjustment of the seat back based on an output from the driver monitoring system.

12. The shoulder blade position estimation apparatus according to claim 10, wherein the actuator further bases the height adjustment of the seat back based on an output from the driver monitoring system.

13. The shoulder blade position estimation apparatus according to claim 2, further comprising a driver monitoring system that is an image processor that identifies the occupant seated on the seat by facial recognition and that acquires information related to a build based on images captured by a camera.

14. The shoulder blade position estimation apparatus according to claim 13, wherein the driver monitoring system is configured to determine a height position of a first thoracic vertebra present in an upper portion of shoulders of the occupant.

15. The shoulder blade position estimation apparatus according to claim 14, wherein the actuator further bases the height adjustment of the seat back based on an output from the driver monitoring system.

16. The shoulder blade position estimation apparatus according to claim 15, wherein the actuator further bases the height adjustment of the seat back based on an output from the driver monitoring system.

17. The shoulder blade position estimation apparatus according to claim 1, wherein the surface pressure sensor is configured to detect a first distribution at a first region that is in a predetermined height range of the seat back in a direction of vehicle height, and
wherein, when the occupant turns the steering wheel from a neutral position by a predetermined degree and then a second region, where the surface pressure equal to or more than a predetermined pressure, in the first region, increases or decreases, the processor is configured to estimate a position of the shoulder blades by calculating center point of the first region.

* * * * *